United States Patent Office 3,834,917
Patented Sept. 10, 1974

3,834,917
PRODUCTION OF SYNTHETIC ANHYDRITE
Bernhard Spreckelmeyer, Leverkusen, Friedrich Hinsche, Leverkusen-Bayerwerk, and Werner Schabacher, Leverkusen, Germany, assignors to Bayer Aktiengesellschaft, Leverkusen, Germany
Filed Jan. 26, 1973, Ser. No. 326,755
Claims priority, application Germany, Feb. 3, 1972,
P 22 05 028.8
Int. Cl. C04b 11/00
U.S. Cl. 106—109        7 Claims

ABSTRACT OF THE DISCLOSURE

Treatment of the kiln residue which is formed during hydrogen fluoride production by the reaction of fluorspar with concentrated sulphuric acid in a hot furnace by the steps of adding a neutralizing agent to the kiln residue while at an elevated temperature, evaporation cooling the mixture to a temperature of 80 to 150° C. and grinding the cooled kiln residue after water vapour removal to obtain a pneumatically transferable, free-flowing synthetic anhydrite.

---

Figure 1:
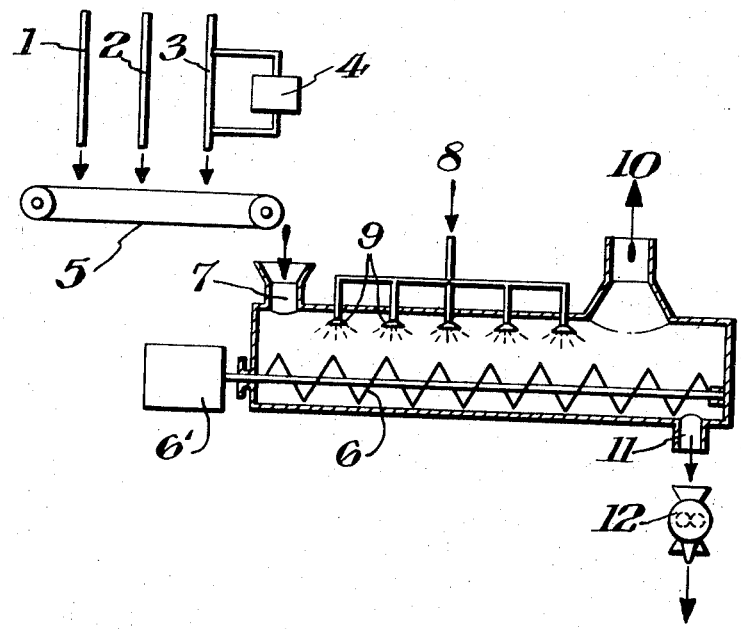

This invention relates to a process for the production of a synthetic anhydrite which can be pneumatically transferred and can be transported in silo vehicles. The reaction of fluorspar with concentrated sulphuric acid gives as reaction products gaseous hydrogen fluoride and an anhydrous calcium sulphate which is known as kiln residue.

Both reaction products contain as impurities more or less large quantities of the other components of the reaction system. Since the fluorspar contains as impurities inter alia heavy spar ($BaSO_4$), calcium carbonate ($CaCO_3$), iron, aluminium and silicon compounds, and flotation agents (from the concentrating step), these substances, or products formed from them during the reaction, also occur as impurities in the two main reaction products.

Accordingly, depending upon the quality of the fluorspar used and upon the manufacturing process adopted, the kiln residue may contain, in addition to calcium sulphate, sulphuric acid (0.5–10%), fluorspar (0.5–5%), hydrofuoric acid (~0.1%), iron sulfates (0.1–1% Fe), aluminium sulphates, water and flotation agents as the most important impurities. Other impurities, essentially in the form of iron and iron compounds, are formed by corrosion and abrasion in the production plants.

In order to keep this fraction as low as possible and in order that the kiln residue may be used as binder (for construction purposes, e.g. flooring) a neutralising agent for the excess acid is generally added to the material immediately after it leaves the furnace in which the hydrofluoric acid is produced (DAS No. 1,017,518, U.S. Pat. No. 2,959,466). Thereafter, the material is ground to the usual fineness, approximate values for which are laid down in DIN 4208. An activator for setting the anhydrite can be added at different stages of the production process depending upon the type used. A summary of possible activators and combinations thereof can be found in DAS No. 1,062,609.

Although showing favourable setting properties and high strength, an anhydrite prepared in this way has a tendency towards caking and aggregation. Accordingly, it can generally be transported only as a bagged product and not in silo vehicles.

By increasing the operating temperature of the hydrofluoric acid furnace from about 200° C. to from 250 to 300° C., it is possible to reduce the free sulphuric acid content of the cinder to around 0.5% and this is accompanied by a slight reduction in the tendency of the synthetic anhydrite towards caking. Unfortunately, this method requires considerable energy and often gives a synthetic anhydrite which shows a long setting time and develops low strengths. In addition, in order to obtain a uniform quality, the $H_2SO_4$-content of the cinder must be kept at less than 0.5%, even slight disturbances in operation being sufficient to give an unusable material.

An object of the present invention is to provide a highly reliable and simple process for producing a pneumatically feedable anhydrite with good properties.

According to the invention, this object is achieved by neutralising the kiln residue while it is still hot and cooling it immediately thereafter by direct evaporation cooling in an atmosphere containing water vapour to temperatures of from about 80 to 150° C., preferably from 100 to 130° C., the product being ground after the water vapour removal and, if necessary, after further cooling.

Accordingly, the invention relates to a process for the production of a pneumatically transferable, free-flowing synthetic anhydrite from kiln residue formed in hydrofluoric acid production in which process following the addition of a neutralising agent, the still hot kiln residue is cooled by direct evaporation cooling in an atmosphere containing water and/or water vapours to temperatures of from about 80 to 150° C., preferably from 100 to 130° C., and the kiln residue is then ground after removal of the water vapour and, optionally, after further cooling (>80% passing a 0.09 mm. screen).

The anhydrite thus obtained is itself free-flowing and, after grinding to standard fineness, gives a non-caking, pneumatically transferable product which can be transported in silo vehicles. This result contrasts directly with a suggestion in U.S. Patent Specification No. 2,959,466 that the basic neutralising agent must be added in the complete absence of moisture to avoid the formation of hemi-hydrate.

Tests in which $H_2O$-evaporation cooling was carried out in the absence of previous neutralisation, gave after grinding a material subject to heavily caking. Even the subsequent addition of excess CaO followed by regrinding did not improve this behaviour in any way.

Surprisingly, hydration, i.e. conversion of the anhydrite into the semi-hydrate, does not occur under the conditions of the process according to the invention in which previously neutralised kiln residue is only brought into contact with sufficient water or water vapour for cooling to a temperature of from about 80 to 150° C., preferably from 100 to 130° C., and kiln residue and water vapour are separated before further cooling.

The kiln residue is preferably crushed before or during neutralisation. Neutralisation is preferably carried out by adding CaO, although other neutralising agents such as $Ca(OH)_2$ can be used. In addition, a slight excess of neutralising agent beyond the quantity required for reacting with the acid is preferably added so that the anhydrite is slightly basic. A free base content of from about 0.5 to 3.0% by weight, expressed as CaO and based on $CaSO_4$, is sufficient for this purpose. The kiln residue generally leaves the hydrofluoric acid furnace at a temperature of from 150 to 200° C. The temperature of the kiln residue should not fall below 100° C., and preferably not below 130° C., before it is treated with water or water vapour said cooling effecting a temperature drop of at least 10 to 50° C. The product is ground to a fineness of >80% smaller than 0.09 mm.

The usual activators, such as potassium sulphate, iron sulphate, aluminium sulphate or mixtures thereof, can be added at any stage during the production process, i.e. during the reaction of the fluorspar with the sulphuric acid and/or during after treatment of the kiln residue before, during or after neutralisation or during crushing coarse- or fine-grinding. It is also possible to produce the actual activators from other starting materials during the reaction in the hydrofluoric acid furnace or during neutralisation.

One preferred embodiment of the process is described below in greater detail with reference to FIG. 1:

In FIG. 1:

(1)=measured addition of activator,
(2)=measured addition of CaO,
(3)=anhydrite addition,
(4)=primary crushers for the anhydrite,
(5)=conveyor system (e.g. Redler conveyor),
(6)=mixing screw (e.g. a double screw),
(6')=gear unit for the mixing screw,
(7)=inlet for premixed material,
(8)=addition of water or water vapour,
(9)=distributors for water or water vapour,
(10)=extraction system,
(11)=outlet for anhydrite,
(12)=fine-grinding for the anhydrite.

The kiln residue (3) from the hydrofluoric acid furnace is introduced, optionally through primary crushers (4), onto a conveyor (5), for example a Redler conveyor, CaO is also introduced onto this conveyor at (2) in an excess of from 0.5 to 3.0% by weight (based on the quantity of kiln residue) over that required to neutralise the acid in the kiln residue. If required an activator, for example $K_2SO_4$, can also be introduced onto this conveyor at (1).

Thus, before entering a mixing screw (6), for example a double screw or any other type of mixer, the components are already thoroughly mixed and, in addition, the early addition of CaO substantially eliminates corrosion problems along the conveyor path.

The premixed material enters the mixing screw (6) through a duct (7) at a temperature of from 120 to 200° C.

During the delivery and mixing in the screw, the material is sprayed with water at (8) or brought into contact with a super-saturate water vapour atmosphere in such a quantity that the temperature of the issuing material is from 80 to 150° C., preferably from 100 to 130° C. The water vapour formed, which is laden with dust particles, is removed at (10) and delivered to an $H_2O$-washer.

The hot free-flowing material is delivered to the grinding machine (12) whose throughput is considerably increased by the improved flow properties of the material. The synthetic anhyrite obtained is free-flowing and can be pneumatically fed into silos from which it can be dispatched in silo vehicles.

The process according to the invention is further illustrated by the following Examples.

EXAMPLE 1

4 metric tons per hour of kiln residue are removed from a hydrofluoric acid furnace and delivered through a primary crusher (4) which releases material with an upper grain-size limit of approximately 2 cm. diameter, to a conveyor (5). The kiln residue contains 1.7% of free acid (expressed as $H_2SO_4$). Addition of 96 kg. of CaO per hour ensures an excess of approximately 2.5% of CaO in the ground synthetic anhydrite. The cinder-CaO mixture enters a mixing screw (6) and (7) with a temperature of approximately 130° C. and is sprinkled from above with 160 liters of water per hour through several nozzles (8) in the mixing screw (6). The water vapour laden with dust particles is removed at (10). The product is cooled to approximately 100° C. when it leaves the mixing screw at (11) and contains 0.1% of physically absorbed water and 0.8% of chemically absorbed water. The still hot product is ground to standard fineness. The synthetic anhydrite thus produced was found to have a good binding quality and is pneumatically transferred (Table 1 under No. 1).

EXAMPLE 2

4 metric tons per hour of kiln residue are removed from the hydrofluoric acid furnace and delivered to the conveyor (5) without size-reduction. The kiln residue contains 5.4% of free acid and 180 kg. of CaO per hour are added to it. The cinder-CaO mixture enters the mixing screw at (7) with a temperature of approximately 150° C., is sprayed in the mixing screw with 160 liters of water per hour and leaves the screw at (11) with a temperature of approximately 125° C. The product contains 0.2% of physically absorbed water and 1.3% of chemically absorbed water.

The synthetic anhydrite thus produced was found to have a good binding quality and is pneumatically transferable (Table 1 under No. 2).

EXAMPLE 3

4 metric tons per hour of kiln residue were removed from the hydrofluoric acid furnace and delivered through a primary crusher (4) to the conveyor (5). The kiln residue contains 1.7% of free $H_2SO_4$ and 96 kg./hour of CaO and 28 kg./hour of $K_2SO_4$ are added. The mixture enters the mixing screw (6) at a temperature of approximately 130° C., is sprayed in the mixing screw with 160 liters/hour of water and leaves the screw with a temperature of approximately 100° C. After grinding to the standard fineness, a synthetic anhydrite incorporating 0.7% of $K_2SO_4$-activator is obtained. The synthetic anhydrite thus obtained after grinding is blowable and gives good binding quality without further addition of activator (Table 1 under No. 3).

EXAMPLE 4

4 metric tons/hour of a non-size reduced cinder containing 5.4% of free acid are removed from the furnace and 180 kg./hour of CaO and 60 kg./hour of $K_2SO_4$ are added. The mixture has a temperature of approximately 150° C. and is cooled to around 125° C. by spraying with 160 liters/hour of $H_2O$. The synthetic anhydride contains 1.5% of incorporated $K_2SO_4$ activator (Table 1 under No. 4).

The valve quoted in the Table for bending tensile strength and compressive strength were determined in accordance with DIN 4208.

The expressions "water-anhydrite factor," "standard input," "pure input" used in the Tables are defined as follows: Water-anhydrite factor: ratio by weight of water to anhydrite, standard input: anhydrite leaned with sand according to DIN 4208, pure input: unleaned anhydrite.

Figure 2:
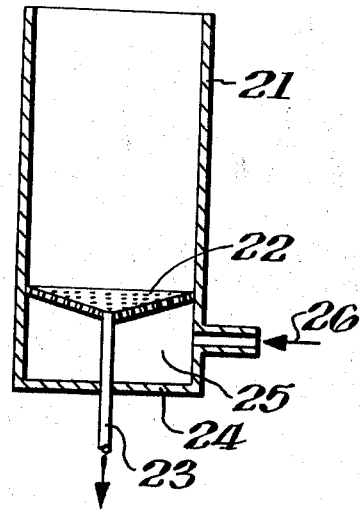

The blowability (pneumatic transferability) was determined in an apparatus of the kind shown in FIG. 2 in which the conditions prevailing in a silo can be readily simulated. The apparatus comprises a tube (21) having a built-in conical sieve plate (22) inclined towards the middle. A tube acting as an outlet (23) is arranged in the centre of the sieve plate. At its lower end, the tube (21) is closed by a plate (24) through which the outlet (23) passes. The sieve plate (22) and the pressure plate (24) form a pressure chamber (25) into which air can be blown through a lateral inlet (26). In order to test the anhydrite for its pneumatic transferability, 40 kg. batches of the material to be tested are introduced into the tube. A constant air stream (quantity: 3 m.³/h., pressure: 0.02 atms.) is then blown in through the lateral inlet. The time taken for the sample to issue from the tube is then measured.

TABLE 1

[Data on the products prepared in accordance with Examples 1 to 4 and comparison figures for synthetic anhydrite produced in the usual way (product 5)]

I.1 General Data

| Product number | Evaporation cooling, percent water added | Analytical data (percent by weight) | | | | Apparent density tons/m.³ | Blowability test through-flow time in seconds for 40 kg. |
|---|---|---|---|---|---|---|---|
| | | CaO | H₂O chemical | H₂O physical | K₂SO₄ | | |
| 1 | 4 | 2.9 | 1.0 | 0.05 | | 0.99 | 22 |
| 2 | 4 | 2.4 | 1.3 | 0.10 | | 0.87 | 20 |
| 3 | 4 | 2.7 | 1.1 | 0.07 | 0.67 | 0.95 | 19 |
| 4 | 4 | 2.9 | 1.4 | 0.10 | 1.47 | 0.89 | 19 |
| 5 | | 1.4 | 1.0 | 0.10 | | 0.9 | ∞ |

I.2 Bending-tensile and Compressive Strengths for Standard and Pure Inputs

| Product number | Water-anhydrite factor | Additional activator, percent | | | Bending-tensile strengths (BZ) and compressive strengths (D) in kp./cm.² as a function of time | | | | | | | | | |
|---|---|---|---|---|---|---|---|---|---|---|---|---|---|---|
| | | K₂SO₄ | FeSO₄·7H₂O | Ca(OH)₂ | 6 hours | | 24 hours | | 3 days | | 7 days | | 28 days | |
| | | | | | BZ | D | BZ | D | BZ | D | BZ | D | BZ | D |
| Standard inputs: | | | | | | | | | | | | | | |
| Minimum values according to DIN 4208 | | | | | | | | | | | 20 | 100 | 40 | 200 |
| 1 | 0.44 | 1.4 | | 0.6 | | | | | 44.2 | 210 | 57.0 | 281 | 67.4 | 308 |
| 2 | 0.43 | 1.4 | | 0.6 | | | | | 28.6 | 169 | 53.8 | 256 | 62.4 | 295 |
| 3 | 0.44 | | | | | | | | 34.6 | 179 | 54.8 | 311 | 67.8 | 293 |
| 4 | 0.44 | | | | | | | | 34.7 | 159 | 56.3 | 263 | 66.9 | 265 |
| 5 | 0.39 | 1.4 | | 0.6 | | | | | 36.0 | 195 | 58.0 | 280 | 61.0 | 300 |
| Pure inputs: | | | | | | | | | | | | | | |
| 1 | 0.36 | 1.0 | 1.0 | | 27.7 | 61 | 65.8 | 319 | 81.2 | 342 | 91.3 | 363 | 113.2 | 494 |
| 2 | 0.36 | 1.0 | 1.0 | | 3.1 | 5.1 | 39.9 | 133 | 63.0 | 205 | 76.7 | 281 | 76.3 | 276 |
| 3 | 0.36 | | 1.0 | | 5.3 | 13.0 | 54.4 | 190 | 70.9 | 254 | 87.5 | 330 | 102.8 | 401 |
| 4 | 0.36 | | 1.0 | | 6.0 | 17.3 | 40.7 | 146 | 62.0 | 231 | 80.2 | 292 | 97.7 | 297 |
| 5 | 0.36 | 1.0 | 1.0 | | 10.0 | 23.0 | 42.0 | 150 | 64.0 | 200 | 84.0 | 280 | 90.0 | 300 |

We claim:

1. In the process of producing synthetic anhydrite from kiln residue which is formed during hydrogen fluoride production by the reaction of fluorspar with concentrated sulphuric acid in a hot furnace, the improved method of producing pneumatically transferable, free-flowing, synthetic anhydrite which comprises adding a neutralizing agent to said kiln residue after removal from said furnace and while at an elevated temperature of at least 100° C., evaporation cooling the hot mixture by direct contact with water, water vapour or a mixture thereof down to a temperature of from 80 to 150° C. and then grinding said kiln residue after water vapour removal.

2. The process of claim 1 wherein the hot kiln residue after adding the neutralising agent is cooled to a temperature of from 100 to 130° C. during said evaporation cooling.

3. The process of claim 1 wherein the mixture contains an excess of from about 0.5 to 3% by weight of free base calculated as calcium oxide and based on the weight of CaSO₄ in said kiln residue.

4. The process of claim 1 wherein the kiln residue is size-reduced prior to evaporation cooling.

5. The process of claim 1 wherein said ground kiln residue is further cooled and is then additionally ground.

6. The process of claim 1 wherein said evaporation cooling is over a temperature range of at least 10 to 50° C.

7. The process of claim 1 wherein said neutralizing agent is selected from the group consisting of calcium oxide, calcium hydroxide and a mixture thereof.

References Cited

UNITED STATES PATENTS

| 2,959,466 | 11/1960 | Reimers | 23—122 |
| 3,415,910 | 12/1968 | Kinkade et al. | 263—53 |
| 2,890,129 | 6/1959 | Kaufmann | 106—109 |

DELBERT E. GANTZ, Primary Examiner

J. P. SHEEHAN, Assistant Examiner

U.S. Cl. X.R.

423—555